United States Patent
Pirko

(10) Patent No.: US 9,680,774 B2
(45) Date of Patent: Jun. 13, 2017

(54) NETWORK INTERFACE CARD OFFLOADING

(71) Applicant: Red Hat, Inc., Raleigh, NC (US)

(72) Inventor: Jiri Pirko, Chocen (CZ)

(73) Assignee: Red Hat, Inc., Raleigh, NC (US)

(*) Notice: Subject to any disclaimer, the term of this patent is extended or adjusted under 35 U.S.C. 154(b) by 205 days.

(21) Appl. No.: 14/190,362

(22) Filed: Feb. 26, 2014

(65) Prior Publication Data

US 2015/0244573 A1    Aug. 27, 2015

(51) Int. Cl.
*H04L 12/879* (2013.01)
*H04L 12/861* (2013.01)
*H04L 29/06* (2006.01)

(52) U.S. Cl.
CPC ........ *H04L 49/901* (2013.01); *H04L 49/9068* (2013.01); *H04L 63/0227* (2013.01)

(58) Field of Classification Search
CPC ....................................................... H04L 12/24
See application file for complete search history.

(56) References Cited

U.S. PATENT DOCUMENTS

| | | | |
|---|---|---|---|
| 7,058,083 B2 | 6/2006 | Melpignano et al. | |
| 7,930,422 B2 | 4/2011 | Freimuth et al. | |
| 7,974,209 B1 | 7/2011 | Maurfer et al. | |
| 8,341,286 B1 | 12/2012 | Craft et al. | |
| 8,402,305 B1 | 3/2013 | Havemose | |
| 8,483,221 B1 | 7/2013 | Vincent et al. | |
| 2005/0021680 A1 | 1/2005 | Ekis et al. | |
| 2008/0271134 A1 | 10/2008 | Johnson et al. | |
| 2009/0316711 A1* | 12/2009 | Memon .................. | H04L 47/10 370/412 |
| 2011/0075613 A1* | 3/2011 | Yuan ................. | H04W 72/1215 370/329 |
| 2013/0013907 A1 | 1/2013 | Marino et al. | |
| 2013/0179505 A1 | 7/2013 | Cardona et al. | |
| 2015/0244574 A1 | 8/2015 | Pirko | |

FOREIGN PATENT DOCUMENTS

WO    2012-131806 A    10/2012

OTHER PUBLICATIONS

Non-final Office Action mailed on Aug. 13, 2015 for U.S. Appl. No. 14/190,368.
"Impulse C integrates to Solarflare AOE Programmable Network Interface Card" http://www.automatedtrader.net/news/algorithmic-trading-news/142114/impulse-c-integrates-to-solarflare-aoe-programmable-network--interface-card, Feb. 6, 2013.
"A Reconfigurable and Programmable Gigabit Ethernet Network Interface Card" http://li46-224.members.linode.com/publications/papers/shafer-tree0611.pdf, Dec. 2006.

(Continued)

*Primary Examiner* — Hassan Phillips
*Assistant Examiner* — Omeed D Rahgozar
(74) *Attorney, Agent, or Firm* — Lowenstein Sandler LLP

(57) ABSTRACT

A network interface controller (NIC) executes a set of instructions with respect to received data communications packet and generates output data associated with the execution of the set of instructions. The NIC stores the output data in a location that is accessible to an operating system.

20 Claims, 4 Drawing Sheets

(56) References Cited

OTHER PUBLICATIONS

"Spinach: A Liberty-based Simulator for Programmable Network Interface Architectures" https://engineering.purdue.edu/~vpai/Publications/willmann-Ictes04.pdf, Jun. 11-13, 2004.
"Developing Custom Firmware for the Red Storm SeaStar Network Interface" http://www.cs.sandia.gov/~ktpedre/papers/fw-cug05.pdf, May 16, 2005.
Final Office Action mailed on Feb. 2, 2016, on U.S. Appl. No. 14/190,368.
Final Office Action mailed on Nov. 21, 2016, on U.S. Appl. No. 14/190,368.
Non-Final Office Aciton mailed on Jun. 17, 2016, on U.S. Appl. No. 14/190,368.

* cited by examiner

NETWORK INTERFACE CARD OFFLOADING

TECHNICAL FIELD

Embodiments of the present disclosure relate to data handling, and more specifically to offloading operations to a network interface card.

BACKGROUND

Network interface cards (NICs), also known as network adapters, network interface controllers, or local area network (LAN) adapters, are hardware devices that handle interfaces to computer networks and allow a computing device, such as a network-capable device, to access the respective networks. The NIC has a read-only memory chip that stores a unique number, the media access control (MAC) address. The MAC address identifies the device uniquely on the network (e.g., LAN). The NIC is both layer 1 (physical layer) and Layer 2 (data link layer) device, since it provides physical access to a networking medium and provides a low-level addressing system, typically using the MAC address. The NICs generally allow users of the computing devices to connect over wired or wireless networks.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein are methods and systems for offloading operations to a network interface card. Conventional computer programs are increasingly complex and often push processors to their performance limits. As network interface card (NIC) technology improves, so does the ability of NICs to process data. Accordingly, it is desirable for an operating system to offload operations from a processor to a NIC. Under conventional systems, however, operating systems lose control and visibility of operations that are offloaded to a NIC. For example, when the operating system is to send 100 packets over a network, it instructs the processor to send these packets. In some conventional systems, the handling of some or all of the 100 packets may be offloaded to the NIC. At this point, the operating system typically loses control of network communications because the NIC takes over. Also, under conventional systems, the operating system may not know the nature of the data communications the NIC received over a network. Instead, the operating system may only know of the data that the NIC allows into the computing system. For example, firewall functionality that is implemented in an operating system cannot be offloaded to a NIC because the operating system loses visibility of operations handled by the NIC. This is problematic because, without seeing network communications (incoming or outgoing), the operating system cannot filter the network communications (or know what network communications were filtered) according to firewall rules.

Aspects of the present disclosure provide a mechanism for providing an operating system with visibility into a NIC that handles offloaded operations. In one embodiment, the operating system identifies a set of rules associated with a function of a NIC, such as handling network communications and/or implementing a firewall. The operating system generates a set of operations (e.g., executable instructions) in view of the set of rules to offload to the NIC. The operating system sends (e.g., offloads) the set of operations to the NIC for execution by the NIC. The NIC can generate a report after the NIC has executed at least one operation from the set of operations. The report can provide the operating system with visibility into how the NIC handled the offloaded operations. The operating system can access the report. Implementations of the present disclosure can also be used for routing data, such as for tracking incoming and outgoing data that is handled by a computing system.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
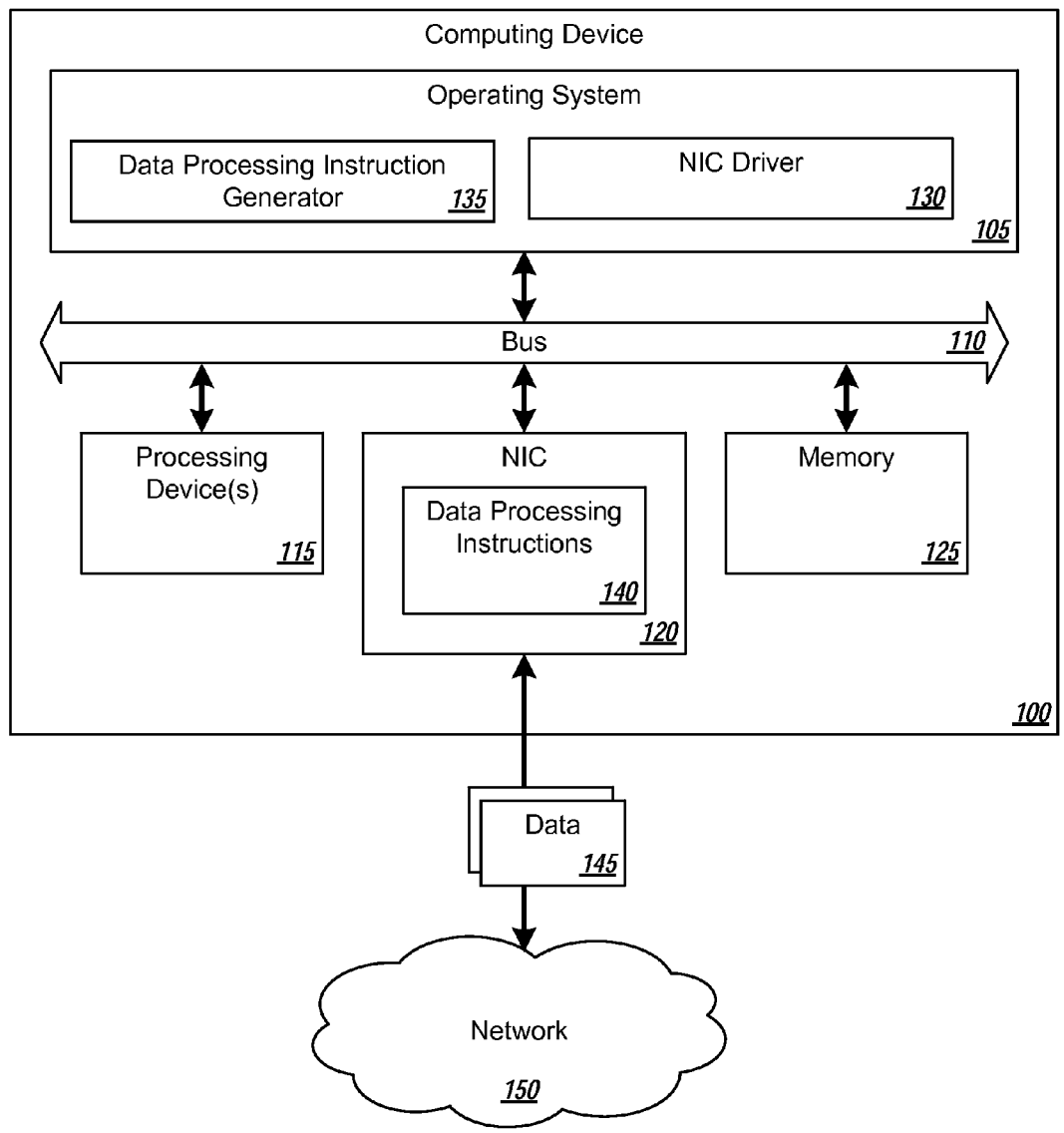
FIG. 1 is a block diagram that illustrates an embodiment of a computer system, in accordance with embodiments.

FIG. 1 is a block diagram that illustrates an example computer system (referred to herein as a computing device 100) in which aspects of the present disclosure can be implemented. The computing device 100 may be a rack-mount server, a workstation, a desktop computer, a notebook computer, a tablet computer, a mobile phone, a palm-sized computing device, a personal digital assistant (PDA), etc. The computing device may additionally include a server (e.g., a web server), a database and/or database management system (DBMS), a hypervisor and/or virtual machines, or other functionality.

The computing device 100 includes an operating system (OS) 105, such as such as Microsoft Windows®, Linux®, Solaris®, Mac® OS, etc. The OS 105 can include a kernel that serves as a central component for facilitating communication (e.g., via bus 110) between software applications and hardware devices (e.g., processing device(s) 115, network interface controller(s) (NIC) 120, memory 125, input/output (I/O) devices, etc.) of computing device 100. For example, a kernel may be responsible for facilitating operating system functions and various management tasks (e.g., process management, disk management, memory management, operation offloading, etc.).

The computing device 100 can include various hardware components including one or more processing device(s) 115, network interface controller(s) (NIC) 120 and memory 125. The processing device(s) 115 can be any type of processor (hardware, virtual) and can include any number of cores capable of handling any number of threads. The memory 125 may include volatile memory devices (e.g., random access memory (RAM)), non-volatile memory devices (e.g., flash memory), and/or other types of memory devices. The computing device 100 may also be coupled to external storage (not shown) via a direct connection or a network 150. Other examples of hardware components that computing device 100 can include are a graphics card, hardware RAID controller, secondary storage (e.g., hard disk drive, magnetic or optical storage based disks, tapes or hard drives), universal serial bus (USB) devices, internal input/output (I/O) devices, etc. The computing device 100 may be a single machine or multiple machines arranged in a cluster.

The NIC 120 provides an interface between the computing device 100 and the network 150. The NIC 120 may support wired standards, wireless standards, or both. The NIC 120 may be an Ethernet controller, Wi-Fi controller, Token Ring, InfiniBand, and so forth. The NIC 120 can provide functionality to communicate over a network using specific physical layer (OSI layer 1), data link layer (OSI layer 2), network layer (OSI layer 3) and transport (OSI layer 4) standards (e.g., Ethernet, Wi-Fi, Token Ring, InfiniBand, TCP, IPv4, IPv6, etc.). The NIC 120 can include a unique media access control (MAC) address, which may be stored in a read only memory of the NIC 120.

In implementations, it may be desirable for the OS 105 to offload processing functionality to the NIC 120. For example, the processing device 115 may conventionally handle data processing within the computing system 100. To reduce an amount of data processing handled by the processing device 115, the OS 105 can offload certain processing functionality to other components of the computing system 100, such as the NIC 120. In some implementations, data processing is offloaded from the processing device 115 when it cannot keep up with data processing demands (e.g., high speed, performance, bandwidth). A decision to offload processing functionality from the processing device 115 to the NIC can be based on the processing device 115 (e.g., availability, current workload, predicted workload, future workload) and/or network communications (e.g., size and/or speed of incoming/outgoing data, bandwidth). In some implementations, the OS 105 makes the decision to offload processing operations to the NIC 120 and such a decision can be based on the above factors or other factors. In some implementations, a system administrator can decide that processing functionality should be offloaded to the NIC 120. The system administrator can provide input to the OS 105 that is related to NIC offloading. In some implementations, the OS 105 can include instructions to offload certain functions to the NIC 120 and can generate, in view of the set of rules, a set of executable instructions to be offloaded to the NIC 120.

When offloading operations to the NIC 120, the OS 105 can identify a set of rules associated with a function of the NIC 120. Example functions of the NIC 120 can include: connecting the computing system 100 to the network 150, network communications processing, allowing communication between the computing system 100 and other computing systems via the network 150, and the like. In implementations, a system administrator or a user can create the set of rules. For example, the set of rules can be rules for implementing a firewall, which can include a rule to block traffic from a particular source.

A data processing instruction generator 135 within OS 105 can generate a set of executable instructions (e.g., data processing instructions 140) in view of the set of rules. The data processing instruction generator 135 can convert the set of rules into one or more executable instructions. The executable instructions can be in any format, in any code language and can be compiled or non-compiled code. In some implementations, the data processing instruction generator 135 compiles the set of executable instructions into binary code that is executable by the NIC 120. In other implementations, after receiving the set of instructions, the NIC 120 can compile the set of instructions into binary code that is executable by the NIC 120. The executable instructions can be associated with any process, task, functionality or desired result. The set of executable instructions can relate to Transmission Control Protocol (TCP) offloading, implementation of a firewall, virtual local area network (VLAN) handling. In implementations, the data processing instruction generator 135 generates the set of executable instructions under the direction of the OS 105. The set of executable instructions can be stored in a data store that is communicably connected to the OS 105.

The OS 105 can include a NIC driver 130 can be an interface between the OS 105 and the NIC 120. The OS 105 can communicate the set of executable instructions to the NIC 120 via the NIC driver 130. In implementations, the NIC driver 130 provides an application programming interface (API) that the OS 105 can use to provide the set of executable instructions to the NIC 120.

The NIC 120 can receive the set of executable instructions from the OS 105 via the NIC driver 130 and can store the set of executable instructions as data processing instructions 140. The NIC 120 can use the data processing instructions 140 when processing data 145 (e.g., incoming or outgoing network communications). The data processing instructions 140 can identify a location (e.g., a memory, a data store) to store output data associated with an execution of the data processing instructions 140. The location can be accessible to the OS 105.

After receiving data 145, the NIC 120 can execute the set of instructions with respect to the incoming or outgoing network communications to generate output data. The NIC 120 can store the output data in a location accessible to the OS 105. The output data can include a report associated with the execution of the data processing instructions 140. The output data can include a time that the data processing instructions 140 were executed, a packet length, a packet header, a header length, a type of protocol, version of protocol, or a result of the execution of the set of instructions. For example, when the data processing instructions 140 are associated with implementing firewall functionality, the NIC 120 can filter a particular packet that is not permitted according to firewall rules. The NIC 120 can provide, as part of the output data, that the particular packet was blocked, and other information about the particular packet, such as time received, time processed, size, header, header length, source, originating IP address, type of protocol, and the like. The OS 105 can have access to this data and thereby, the OS 105 can be aware of how the NIC 120 is implementing the data processing instructions 140.

In some implementations, the NIC 120 stores the output data in memory 125, which can be a shared memory. In implementations, the NIC 120 stores the output data and then grants, to the OS 105, access to the output data. For example, the NIC 120 can store the output data at a certain location in NIC memory and then provide the OS 105 with an address of that location. In other implementations, when generating a set of executable instructions, the data processing instruction generator 135 can identify a location where the NIC 120 should subsequently store output data associated with an execution of the set of instructions. The data processing instruction generator 135 can include this location with the set of executable instructions. In some implementations, the NIC 120 can transmit the output data to the OS 105. The OS 105 can access the memory 125 to identify information related to any operations that were offloaded to the NIC 120.

In implementations, the NIC 120 can include firmware that governs how to handle network communications. In implementations, the firmware of the NIC 120 can include predefined probe points to receive the data processing instructions 140. For example, the firmware can include a sequence of operations that the NIC 120 should execute when processing a packet. A probe point can be positioned at any place with respect to the sequence of operations. In an example, a probe point can be at or near the beginning of the sequence of operations. If the NIC 120 executes the data processing instructions 140 at such a probe point, and the packet is blocked, then the NIC 120 can stop processing the packet, thereby saving the NIC 120 from performing the remaining operations. In another example, when the NIC 120 is to inspect a packet as it is ready to be communicated to the OS 105, the probe point can be positioned at or near the end of the sequence of operations. The NIC 120 can include any number of probe points. In implementations, a probe point can be a function call that, when executed, calls an associated set of instructions from a memory.

In implementations, the OS 105 can have access to predefined templates that it can use as the set of instructions. The templates can be for any function or purpose. For example, when a system administrator requests to add a new firewall rule, the OS 105 can identify the appropriate template having a set of instructions for implementing the new firewall rule, and can pass the template to the NIC driver 135. The OS 105 can also generate combinations of templates to create the set of instructions and/or new templates.

In implementations, when the NIC 120 receives the set of instructions from the NIC driver 130, the NIC 120 stores them in a memory, such as NIC memory or memory 125. When the NIC 120 receives a packet, the NIC 120 executes the set of instructions from the memory where the set of instructions is stored. For example, the set of instructions can be 40 bytes—20 instructions at 2 bytes per instruction. The NIC driver 130 can pass the 40 bytes to NIC 120. The NIC 120 can receive the 40 byte set of instructions and can store it in memory. When the NIC 120 receives a packet from the network 150, the NIC 120 can load the set of instructions from the memory and then the NIC 120 can process the packet using the set of instructions.

Figure 2:
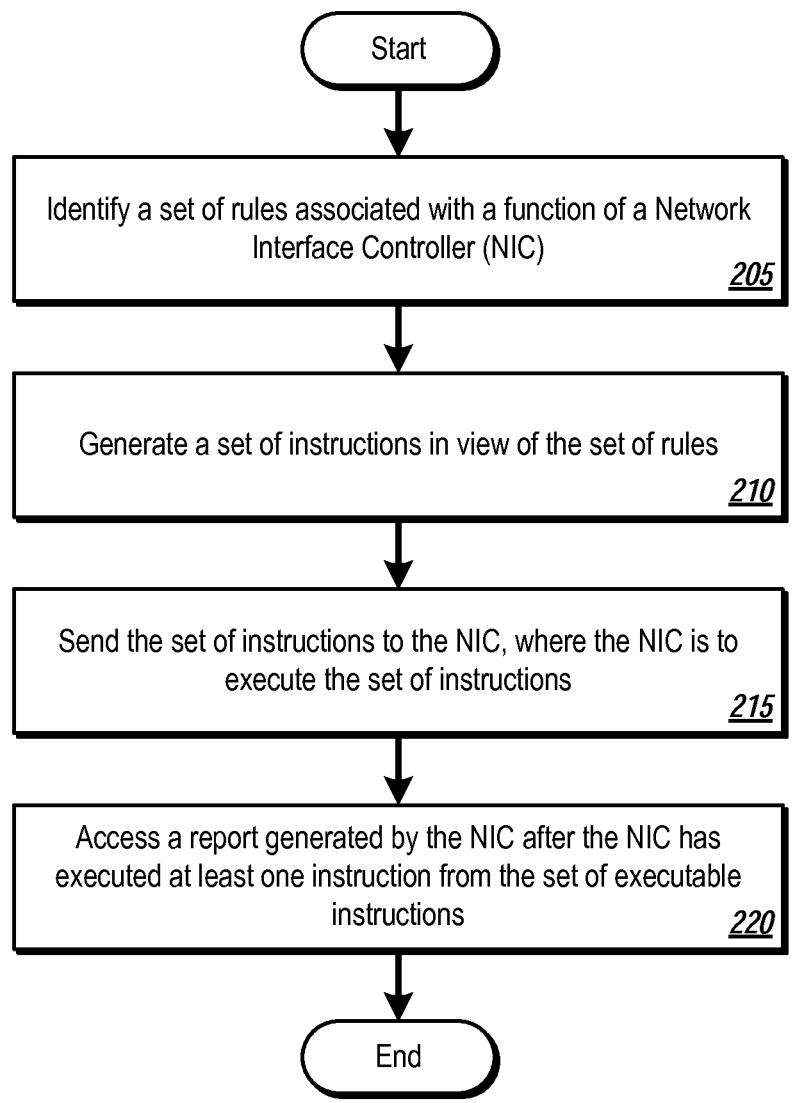
FIG. 2 is a flow diagram illustrating one embodiment for a method of offloading processing operations to a network interface controller (NIC), in accordance with embodiments.
Figure 3:
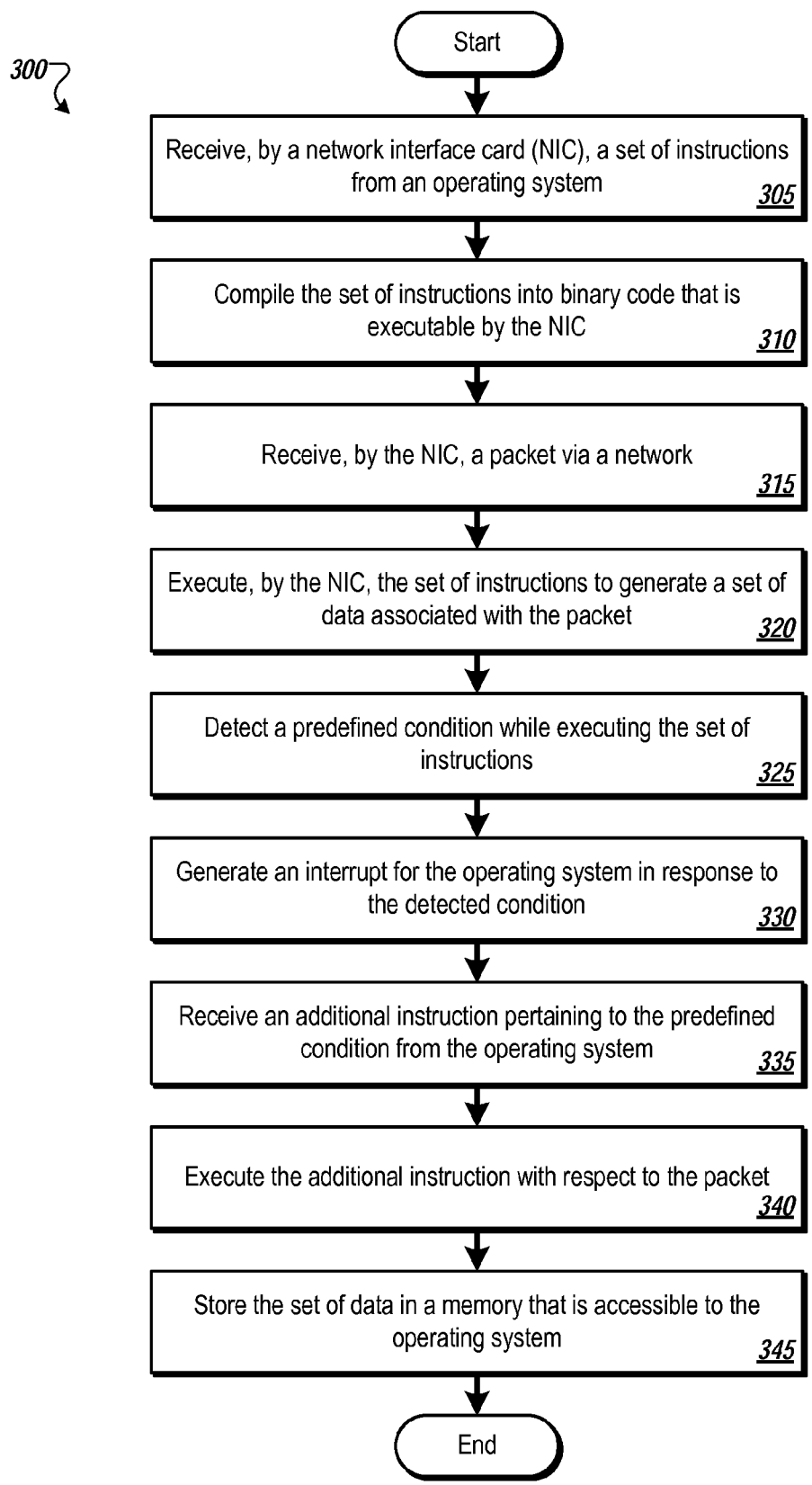
FIG. 3 is a flow diagram illustrating one embodiment for a method of a NIC providing an operating system with access to data, in accordance with embodiments.

FIGS. 2-3 are flow diagrams of various methods related to network interface card (NIC) offloading. The methods can be performed by processing logic that may include hardware (circuitry, dedicated logic, etc.), software (such as is run on a general purpose computer system or a dedicated machine), or a combination of both. For simplicity of explanation, methods described herein are depicted and described as a series of acts. However, acts in accordance with this disclosure can occur in various orders and/or concurrently, and with other acts not presented and described herein. Further, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

FIG. 2 is a flow diagram illustrating one embodiment for a method 200 of offloading processing operations to a NIC. In one implementation, the method is performed by an operating system, such as operating system 105 of FIG. 1.

At block 205 of method 200, processing logic identifies a set of rules associated with a function of a NIC. The set of rules can be a policy that describes how to handle incoming or outgoing network traffic. The set of rules, for example, can relate to one or more of Transmission Control Protocol (TCP) offloading, implementing a firewall, virtual local area network (VLAN) handling, etc.

At block 210, the processing logic generates a set of executable instructions in view of the set of rules. The set of instructions can include executable instructions that a NIC can process. In implementations, the set of executable instructions can include at least one indication of when the NIC should execute the set of executable instructions (e.g., upon an occurrence of a certain condition or event or at a certain time). The set of instructions can sometimes be referred to as a probe. The NIC can include preloaded instructions (e.g., firmware) and the probe can indicate when the NIC should execute the probe in relation to the preloaded instructions. For example, the probe can include an indication that the NIC should execute the probe prior to processing a data packet. In a specific example, the NIC can include twenty preloaded instructions and the probe can indicate that the NIC should execute the probe after the NIC executes the second preloaded instruction and before executing the third preloaded instruction. In some implementations, the processing logic compiles the set of instructions into code (e.g., binary code) that is executable by the NIC.

At block 215, the processing logic sends the set of instructions to the NIC, where the NIC is to execute the set of instructions. During and/or after the NIC's execution of the set of instructions, the NIC can generate a report associated with the execution of the set of instructions. The NIC can store the instructions in a location that is accessible by the processing logic. Some aspects of NIC operations are described in further detail in conjunction with FIG. 3.

At block 220, the processing logic accesses the report generated by the NIC after the NIC has executed at least one instruction from the set of executable instructions. The processing logic can access the report to identify a status of the NIC and operations performed by the NIC. For example, the processing logic can use the report to identify packet drops and modifications.

In implementations, the processing logic can optionally receive an interrupt from the NIC in response to a predefined condition detected by the NIC. The predefined condition can be defined in the preloaded instructions or in the probe. For example, the predefined condition can occur when the NIC identifies a packet from a particular IP address. The predefined condition can also include an absence of an instruction on how the NIC should handle a particular network communication. For example, the predefined condition can occur if neither the preloaded instructions nor the probe instruct the NIC how to process a particular network communication. In implementations, the NIC stops further processing until receiving the additional instruction from the processing logic. The processing logic can generate the additional instruction pertaining to the predefined condition for the NIC in response to the interrupt. For example, the additional instruction can include an instruction on how the NIC should handle the predefined condition (e.g., drop the packet from the particular IP address). The processing logic can send the additional instruction to the NIC and the NIC can execute the additional instruction.

FIG. 3 is a flow diagram illustrating one embodiment for a method 300 of a NIC providing an operating system with access to data. In one implementation, the method is performed by a NIC, such as NIC 120 of FIG. 1.

At block 305 of method 300, processing logic receives a set of instructions from an operating system (e.g., operating system 105 of FIG. 1). The processing logic can receive the set of instructions via a driver (e.g., NIC driver 130 of FIG. 1). The set of instructions can identify a location for subsequently storing output data associated with an execution of the set of instructions. The set of instructions can indicate when the NIC should execute the set of instructions, as described in further detail in conjunction with FIG. 2. The processing logic can receive the instructions in any format or programming language.

At block 310, the processing logic can compile the set of instructions into binary code that is executable by a NIC. At block 315, the processing logic can receive a network communication (e.g., a packet) via a network. In response to receiving the network communication, the processing logic can execute the set of instructions with respect to the network communication to generate output data at block 320. The output data can include actions that were taken in association with executing the set of instructions, such as dropping packets, blocking packets from an IP address, etc. In implementations, when executing the set of instructions, the processing logic can identify a characteristic of the packet (e.g., size, length, IP address, etc.). The set of instructions can include instructions for implementing a firewall according to a set of firewall rules, and the characteristic can be subject to the set of firewall rules. The processing logic can perform an operation on the packet in view of the identified characteristic (e.g., allow through a firewall, block, pause execution of the set of instructions, drop the packet, modify the packet).

At block 325, the processing logic can detect a predefined condition while executing the set of instructions, as described herein. At block 330, the processing logic can optionally generate an interrupt for an operating system (e.g., OS 105 of FIG. 1) in response to detecting the predefined condition. At block 335, the processing logic can receive an additional instruction pertaining to the predefined condition from the operating system and/or from a driver (e.g., the NIC driver 130 of FIG. 1). At block 340, the processing logic can execute the additional instruction.

At block 345, the processing logic stores the output data in the identified location (e.g., a memory) accessible to the operating system.

Figure 4:
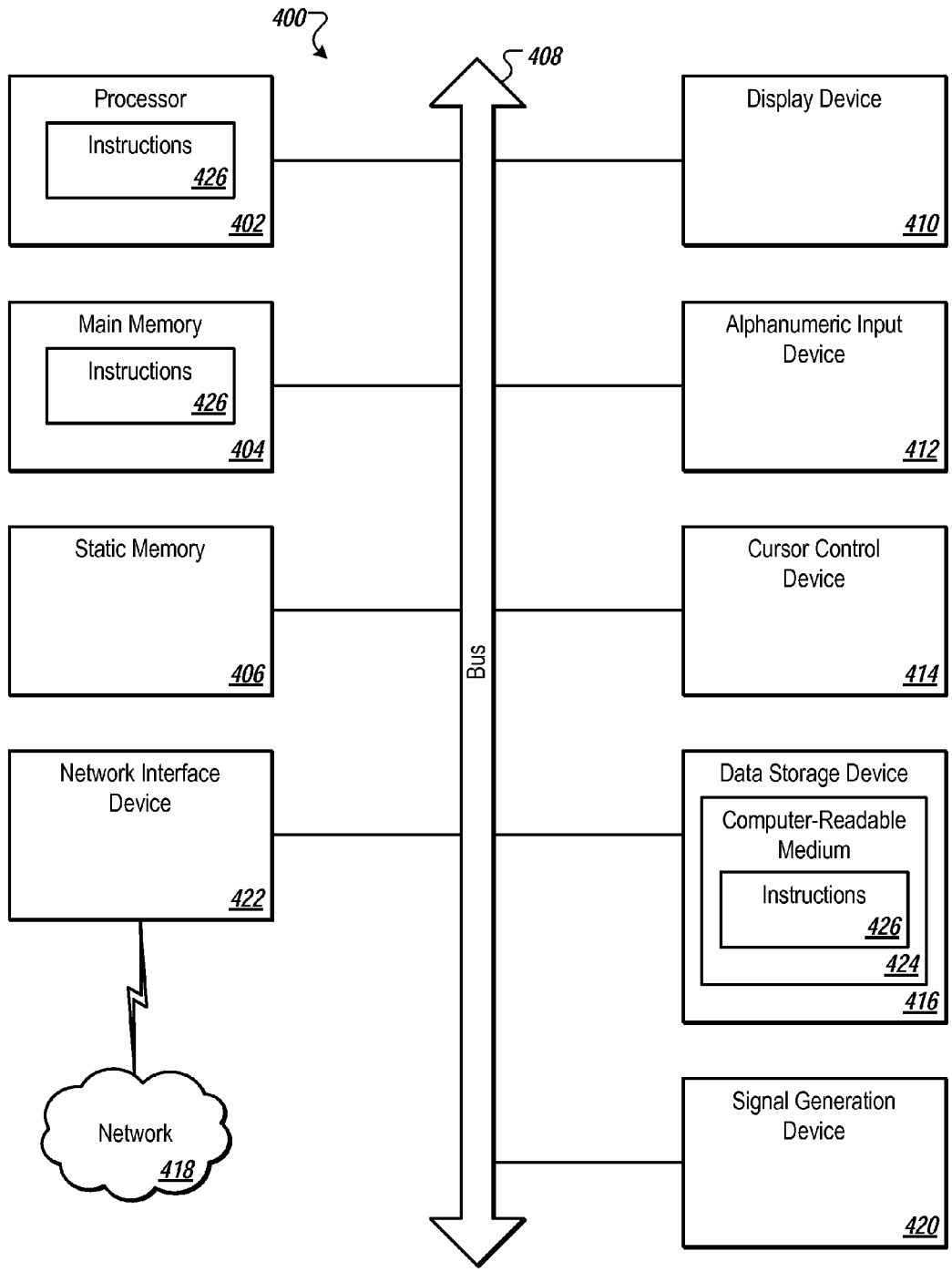
FIG. 4 illustrates a diagrammatic representation of a machine in the example form of a computer system, in accordance with embodiments.

FIG. 4 illustrates a diagrammatic representation of a machine in the example form of a computer system 400 within which a set of instructions, for causing the machine to perform any one or more of the methodologies discussed herein, may be executed. The computer system 400 may correspond to computing device 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 416 (e.g., a data storage device), which communicate with each other via a bus 408.

The processing device 402 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 402 may therefore include multiple processors. The processing device 402 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like.

The computer system 400 may further include one or more network interface devices 422 (e.g., NICs). The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions 454 embodying any one or more of the methodologies or functions described herein (e.g., data processing instruction generator 135). The instructions 454 may also reside, completely or at least partially, within the main memory 404 and/or within the processing device 402 during execution thereof by the computer system 400; the main memory 404 and the processing device 402 also constituting machine-readable storage media.

While the computer-readable storage medium 424 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present invention. The term "computer-readable storage medium" shall accordingly be taken to include, but not be limited to, non-transitory media such as solid-state memories, and optical and magnetic media.

The modules, components and other features described herein can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying", "probing", "establishing", "detecting", "modifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving, by a network interface controller (NIC) comprising preloaded instructions, a set of instructions from an operating system, the set of instructions identifying a location accessible to the operating system to subsequently store output data associated with an execution of the set of instructions, the set of instructions comprising an indicator of an order that the NIC is to execute the set of instructions in relation to the preloaded instructions, the order indicating that the NIC is to execute the set of instructions after the NIC executes a first portion of the preloaded instructions and before the NIC executes a second portion of the preloaded instructions;
   receiving, by the NIC, a packet via a network;
   executing, by a processing device of the NIC and in response to the receiving of the packet, the set of instructions with respect to the packet to generate the output data, wherein the set of instructions and the preloaded instructions are executed in view of the order; and
   storing the output data in the identified location.

2. The method of claim 1, wherein
   the set of instructions comprises a probe,
   the preloaded instructions comprise a sequence of operations the NIC is to execute when processing the packet, and
   the indicator indicates one or more predefined probe points in the sequence of operations when the NIC is to execute the probe.

3. The method of claim 1 further comprising compiling, by the NIC, the set of instructions into binary code that is executable by the NIC.

4. The method of claim 1, wherein the output data associated with the packet comprises at least one of a time, packet length, packet header, type of protocol, or a result of the execution of the set of instructions.

5. The method of claim 1, wherein executing the set of instructions comprises:
   identifying a characteristic of the packet; and
   performing an operation on the packet in view of the identified characteristic.

6. The method of claim 5, wherein the set of instructions comprises instructions to implement a firewall according to a set of firewall rules, and wherein the characteristic is subject to the set of firewall rules.

7. The method of claim 5, wherein the operation comprises at least one of: a modification to the packet or a packet drop.

8. The method of claim 1 further comprising:
   detecting a predefined condition while executing the set of instructions;
   in response to the detected predefined condition, generating an interrupt for the operating system;
   receiving an additional instruction pertaining to the predefined condition from the operating system; and
   executing the additional instruction with respect to the packet.

9. A non-transitory computer readable storage medium having instructions that, when executed by a processing device of a network interface controller (NIC) comprising preloaded instructions, cause the processing device to:
receive, by the NIC, a set of instructions from an operating system, the set of instructions identifying a location accessible to the operating system to subsequently store output data associated with an execution of the set of instructions, the set of instructions comprising an indicator of an order that the NIC is to execute the set of instructions in relation to the preloaded instructions, the order indicating that the NIC is to execute the set of instructions after the NIC executes a first portion of the preloaded instructions and before the NIC executes a second portion of the preloaded instructions;
receive, by the NIC, a packet via a network;
execute, by the processing device and in response to receiving of the packet, the set of instructions with respect to the packet to generate the output data, wherein the set of instructions and the preloaded instructions are executed in view of the order; and
store the output data in the identified location.

10. The non-transitory computer readable storage medium of claim 9, wherein
the set of instructions comprises a probe,
the preloaded instructions comprise a sequence of operations the NIC is to execute when processing the packet, and
the indicator indicates one or more predefined probe points in the sequence of operations when the NIC is to execute the probe.

11. The non-transitory computer readable storage medium of claim 9, wherein the output data associated with the packet comprises at least one of a time, packet length, packet header, type of protocol, or a result of the execution of the set of instructions.

12. The non-transitory computer readable storage medium of claim 9, wherein to execute the set of instructions, the processing device to:
identify a characteristic of the packet; and
perform an operation on the packet in view of the identified characteristic.

13. The non-transitory computer readable storage medium of claim 12, wherein the set of instructions comprises instructions to implement a firewall according to a set of firewall rules, and wherein the characteristic is subject to the set of firewall rules.

14. The non-transitory computer readable storage medium of claim 9, the processing device further to:
detect a predefined condition while executing the set of instructions;
in response to the detected predefined condition, generating an interrupt for the operating system;
receive an additional instruction pertaining to the predefined condition from the operating system; and
execute the additional instruction with respect to the packet.

15. A computing device for a network interface controller (NIC), comprising:
a memory to store preloaded instructions; and
a processing device, operatively coupled to the memory, the processing device to:
receive a set of instructions from an operating system, the set of instructions identifying a location accessible to the operating system to subsequently store output data associated with an execution of the set of instructions, the set of instructions comprising an indicator of an order that the processing device is to execute the set of instructions in relation to the preloaded instructions, the order indicating that the processing device is to execute the set of instructions after the processing device executes a first portion of the preloaded instructions and before the processing device executes a second portion of the preloaded instructions;
receive a packet via a network;
in response to receiving the packet, execute, by the processing device, the set of instructions with respect to the packet to generate the output data, wherein the set of instructions and the preloaded instructions are executed in view of the order; and
store the output data in the identified location.

16. The computing device of claim 15, wherein
the set of instructions comprises a probe,
the preload instructions comprise a sequence of operations the NIC is to execute when processing the packet, and
the indicator indicates one or more predefined probe points in the sequence of operations when the processing device is to execute the probe.

17. The computing device of claim 15, the processing device further to compile the set of instructions into binary code that is executable by the processing device.

18. The computing device of claim 15, wherein when executing the set of instructions, the processing device is to:
identify a characteristic of the packet; and
perform an operation on the packet in view of the identified characteristic.

19. The computing device of claim 18, wherein the set of instructions comprises instructions to implement a firewall according to a set of firewall rules, and wherein the characteristic is subject to the set of firewall rules.

20. The computing device of claim 15, the processing device further to:
detect a predefined condition while executing the set of instructions;
in response to the detected predefined condition, generate an interrupt for the operating system;
receive an additional instruction pertaining to the predefined condition from the operating system; and
execute the additional instruction with respect to the packet.

* * * * *